(No Model.)
C. J. VAN DEPOELE.
SYSTEM OF ELECTRICAL TRANSMISSION OF POWER.
No. 440,976. Patented Nov. 18, 1890.
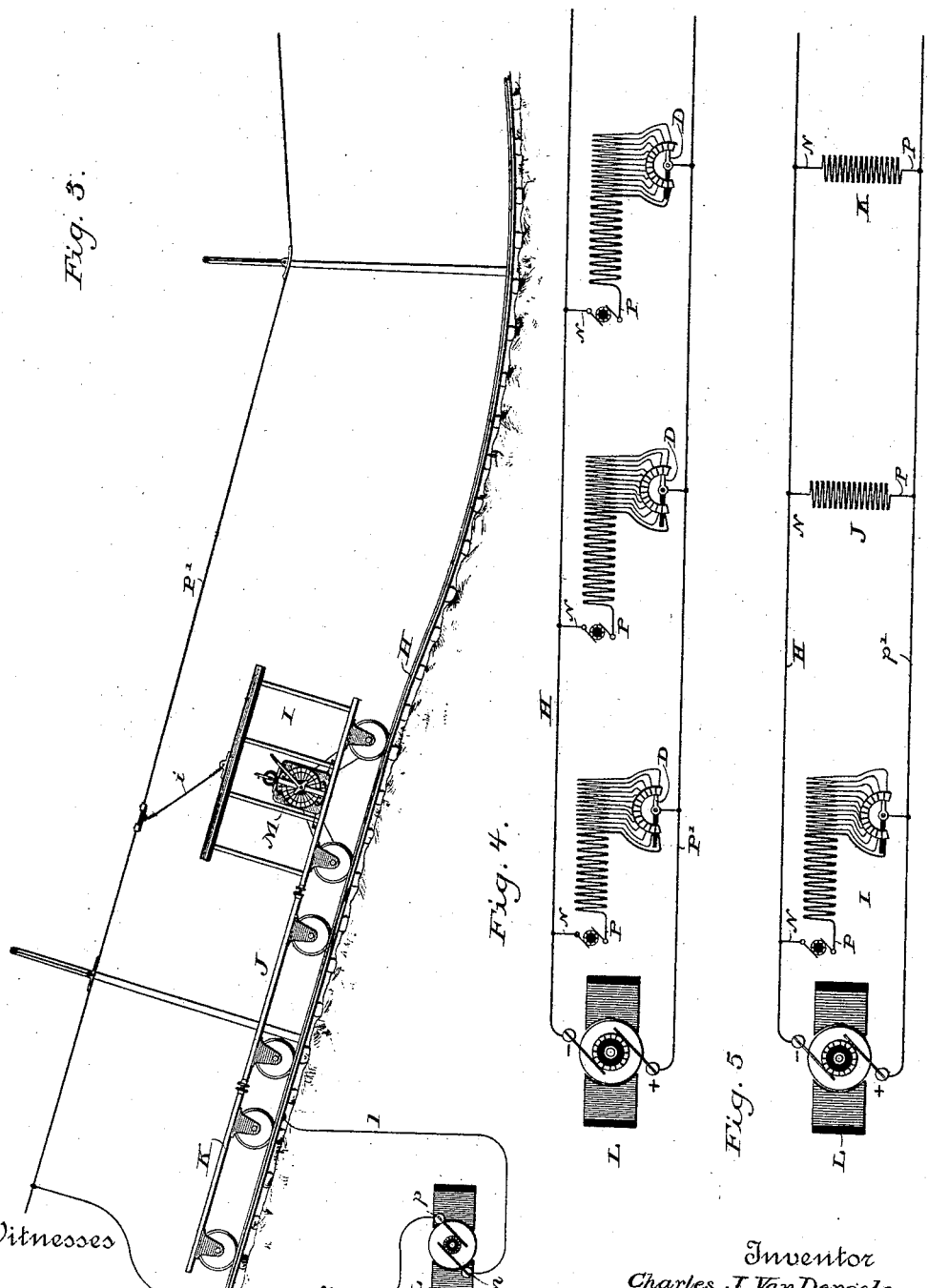

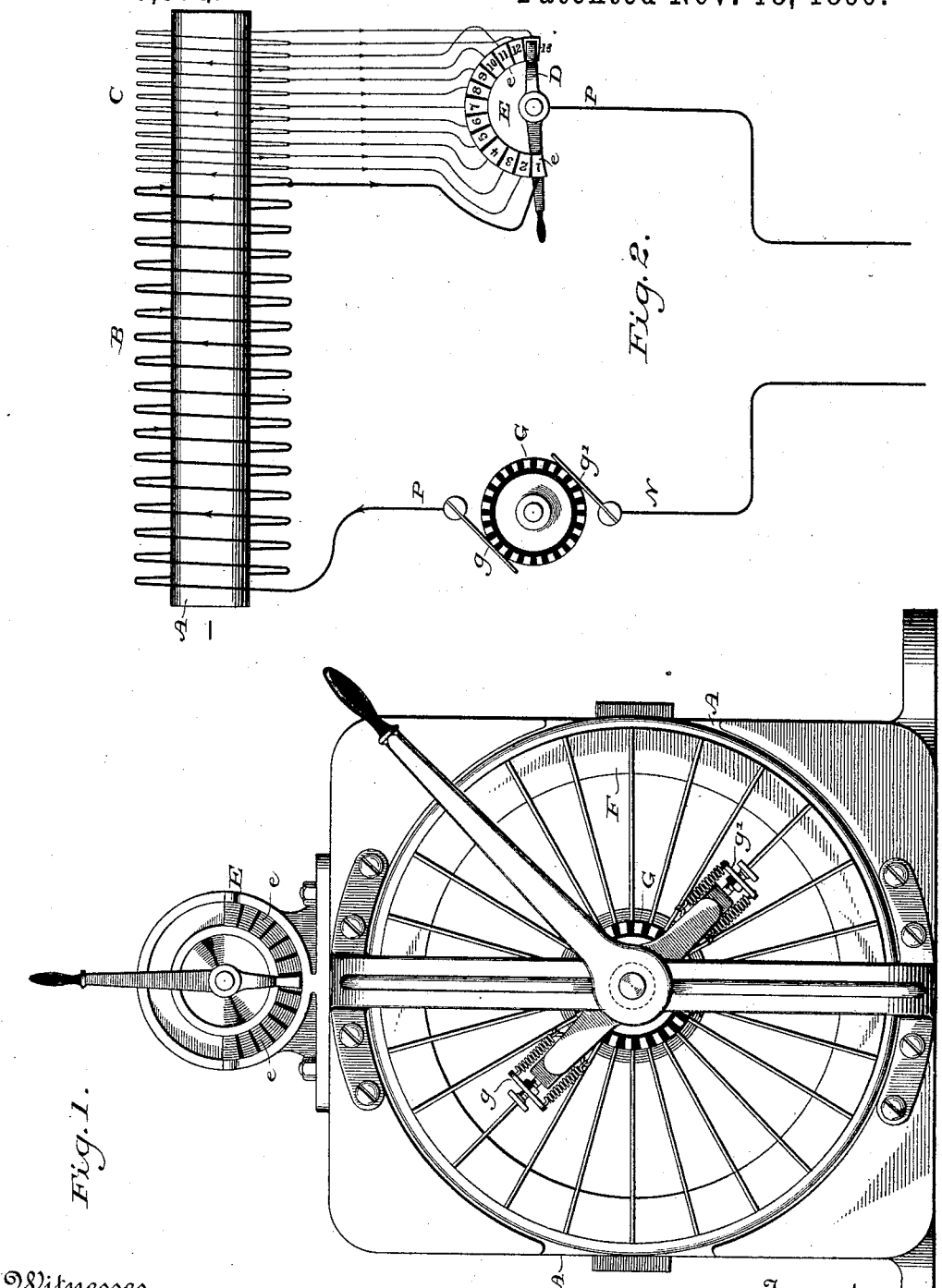

UNITED STATES PATENT OFFICE.

CHARLES J. VAN DEPOELE, OF CHICAGO, ILLINOIS.

SYSTEM OF ELECTRICAL TRANSMISSION OF POWER.

SPECIFICATION forming part of Letters Patent No. 440,976, dated November 18, 1890.

Application filed May 10, 1886. Serial No. 201,714. (No model.)

*To all whom it may concern:*

Be it known that I, CHARLES J. VAN DE-POELE, a citizen of the United States, residing at Chicago, in the county of Cook, State of Illinois, have invented certain new and useful Improvements in Systems of Electrical Transmission of Power, of which the following is a description.

The present invention relates to new and useful improvements in the utilization of electricity as a motive power, whereby an electric motor can be converted into a generator, and the current then produced thereby be added to the main current of the line from which the current is taken to run the system. This can be accomplished by the means hereinafter described, reference being had to the annexed drawings, forming part of this specification, in which—

Figure 1 is a view in elevation of an electro-dynamic motor embodying my invention. Fig. 2 is a diagram of the circuits and connections thereof. Fig. 3 is a view in elevation showing a portion of an electric railway, including a down-grade. Fig. 4 is a theoretical diagram showing the arrangement when two or more motors are used on one train. Fig. 5 is a theoretical diagram showing the arrangement of one motor on a train, the remainder of the cars being provided with electro-dynamic brakes.

Similar letters and figures indicate like parts throughout.

The motor-generator here illustrated is of the type shown and described in my former application, No. 195,212, filed March 15, 1886, now Patent No. 347,902, in which A is the field-magnet core, upon which is wound the ordinary conductor B and also the supplementary conductor C, which latter is, as shown, in series with the main helices B, and provided with a number of terminals 1, 2, 3, 4, 5, 6, 7, 8, 9, 10, 11, 12, and 13, which, by means of a moving contact-arm D, can be thrown into or cut out of the field-magnet circuit, and thereby increase or decrease its magnetizing effect, as fully set forth in said previous application.

E is a stationary commutator for the segments *e*, to which the terminals 1 to 13 are connected.

F is the armature. G is the commutator therefor, and $g\ g'$ are the commutator-brushes bearing thereon and permanently connected to the conductors P N, connected to the main line, which in the case of an electric railway may be, as shown in Fig. 3, an insulated wire for the positive and the rails for the negative.

By moving the arm D from right to left, or vice versa, more or less of the supplementary coils are brought into or out of circuit, and thus the strength of the magnetic field can be varied. By changing the power of the field of force within which the armature revolves the electro-motive and the counter-electro-motive forces of the machine can be varied— viz., the electro-motive force when used as a generator and the counter-electromotor force when used as a motor.

The herein-described method of operation is illustrated in Fig. 3, H representing the track of a railway, upon which is a train consisting of the cars I J K, which are shown as descending a downwardly-inclined portion thereof. L is the generator, located at any suitable point and connected by wire 1 with the track H, and by wire 2 with an overhead conductor P'. A motor-generator M is placed upon the forward car I, and is connected by suitable contact device *i* to the overhead conductor P', which represents the positive side of the circuit, its other terminal being connected through the wheels of the car I with the track H, which forms the negative conductor.

In order to better understand the action of the machine, I will describe it first as a motor. Admitting that the current intended to operate the system will have an electro-motive force of one thousand volts and that the maximum speed of the motor will be, say, twelve hundred revolutions per minute, and that this allows a current of, say, ten ampères to flow through the motor—that is, when the current is flowing only through the main helices of the field-magnets—if now some of the auxiliary coils are placed in circuit the resistance of the motor will correspondingly increase, and also the magnetism in the field-magnets. At the same time a higher counter electro-motive force will be produced by the motor, keeping back the current from the main line or feeding-circuit, which will result in slowing down the speed of the motor, so that when all the auxiliary coils are in circuit the motor will run at its slowest speed, and by making the auxiliary coils more or less resistant the intensity of current flowing through the motor can be varied at will.

By means of the auxiliary coils placed in series with the normal or main field coils we are enabled to govern the counter electro-motive force of the motor, and thus regulate its speed, at the same time regulating the amount of current supplied to the motor. By allowing the current to flow through more or less of the additional helices of the field-magnet we are enabled to modify the strength of the field of force in which the armature revolves, and thus regulate the action of the armature upon the field.

I will now proceed to explain the machine as a generator—that is, when the motor after being driven by a proper source of electricity is cut off therefrom and forcibly rotated, as by the momentum of moving machinery or any other cause—for instance, in an electric railway when the train moves down an incline and thus communicates motion to the motor.

The conditions under which the different results are obtained are briefly as follows: Admitting that the main line from which the motor receives current is kept at a nearly constant potential of, say, one thousand volts, it will be easy to understand that if our motor, run as a generator, produces an electromotive force of exactly one thousand volts, that then the current produced by the motor will be added to that of the main line, and this will continue to be the case as long as the motor is capable of keeping up an electro-motive force equal to that of the main line. This, however, cannot be accomplished with an ordinary motor or generator, since the speed of the moving train or machinery cannot be kept constant, and in the case of an electric railway will vary from its highest speed to a dead stop. However, by my method it is possible and perfectly practical to add to the main line the current capable of being produced by a moving electric generator driven by a train descending a grade and coming from full motion to a stop.

As already explained in the case of an electromotor, the auxiliary coils afford a means of changing the counter electro-motive force, enabling me to run either fast or slow without changing the electro-motive force or potential of the main current, this being accomplished by placing additional coils around the normal field-coils of the electromotor; and it is by the same means that in the case of an electric generator or the motor used as a generator that I accomplish the result of adding the current from the generator to the main line. To illustrate the method the better, let us consider an electric generator driven by a train descending an incline at a speed, say, of twelve hundred revolutions per minute, and that when a motor, now a generator, is running at this speed it produces one thousand volts, as before stated, and that the generator can produce this electro-motive force having only its normal field-coil in series with the armature. Now as long as the speed of twelve hundred revolutions per minute remains constant the electro motive force will remain constant; but since this is impossible and impracticable we have to devise some other means to produce a constant electro-motive force within a moderately-varying range of speed. In order to produce the desired effect, all we have to do is to add some auxiliary coils to the normal coils of the field-magnet as the speed decreases, until when all the coils are in circuit and the speed of the train has fallen so low as to render the machine incapable of producing the needed electro-motive force, at which point the generation of current is stopped by the whole machine being cut out of circuit. As has already been noted, by adding the auxiliary coils to the normal or main coils I augment the electro-motive force of the machine, so that with a lower than the maximum speed I am enabled to keep up the desired electro-motive force to a certain point. If the machine remains in circuit after its electro-motive force drops below that of the line, it will be reconverted into a motor, the current flowing now through it in opposite directions from what it did at first, the current coming now from main line to motor, instead of from generator to main line.

A centrifugal circuit-closer, similar in principle to that shown and described in my patent, No. 257,990, dated May 16, 1882, may be employed to automatically control the circuit or circuits of the auxiliary coils, although other devices may also be utilized.

The main advantage to be derived from this system is that part of the power capable of being created by the lowering down of a load—as, for instance, in retarding the speed of a railway-train running down an incline—which force, as well as the momentum of any other kind of load, can be utilized to drive an electric generator of the kind described, which I have called a "momentum-generator," the current thus obtained, which would otherwise be represented by wasted power or friction on the brakes, being added to the mains or distributing-conductors, the mechanical effect of driving the momentum-generator being also available as a counteracting effect.

What I claim, and desire to secure by Letters Patent, is—

In a system of electrical transmission of power, the combination, in an electric railway, of a supply-circuit extending along the line and carrying current of substantially constant potential, a motor-car making a traveling contact with the supply-circuit, a momentum-generator upon the car and in circuit with the main line and consisting of an electro-dynamic machine connected in series and having a field-magnet of normal capacity, and a series of supplemental field-magnet coils all in series with the normal field-magnet and with the armature, terminals extending from the supplementary field-magnet coils to a series of insulated contacts, a movable contact device and means for actuating the same to connect more or fewer of the supplementary series coils with the field-magnet of the machine to vary its electro-motive force, and thereby to increase or decrease the strength thereof to enable the machine to deliver current of a potential equal to that of the line, and means, also, for reversing the position of the commutator-brushes to change the machine from a motor, when not performing work, to a momentum-generator actuated by the momentum of the vehicle, substantially as described.

In testimony whereof I hereto affix my signature in presence of two witnesses.

CHARLES J. VAN DEPOELE.

Witnesses:
JAMES T. ROBERTS,
JOSEPH A. GABBNEY.